United States Patent
Zhu et al.

(10) Patent No.: US 9,638,397 B2
(45) Date of Patent: May 2, 2017

(54) LIGHTING APPARATUS AND METHOD FOR EMITTING LIGHT HAVING DIFFERENT COLOR TEMPERATURES

(71) Applicant: PHILIPS LIGHTING HOLDING B.V., Eindhoven (NL)

(72) Inventors: Xiaoyan Zhu, Shanghai (CN); Wenyi Li, Shanghai (CN); Shitao Deng, Shanghai (CN); Miao Zhang, Beijing (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 8 days.

(21) Appl. No.: 14/405,554

(22) PCT Filed: May 21, 2013

(86) PCT No.: PCT/IB2013/054176
§ 371 (c)(1),
(2) Date: Dec. 4, 2014

(87) PCT Pub. No.: WO2013/182932
PCT Pub. Date: Dec. 12, 2013

(65) Prior Publication Data
US 2015/0167930 A1 Jun. 18, 2015

(30) Foreign Application Priority Data
Jun. 6, 2012 (CN) .................. PCT/CN2012/076511

(51) Int. Cl.
*F21V 13/02* (2006.01)
*F21V 3/00* (2015.01)
(Continued)

(52) U.S. Cl.
CPC .............. *F21V 13/02* (2013.01); *F21S 8/086* (2013.01); *F21V 3/00* (2013.01); *F21V 5/04* (2013.01);
(Continued)

(58) Field of Classification Search
CPC ..... F21K 9/56; F21W 2131/103; F21S 8/085; F21S 8/086; F21S 8/088; F21V 9/16;
(Continued)

(56) References Cited

U.S. PATENT DOCUMENTS 6,033,093 A   3/2000  Latsis et al.
7,090,370 B2 *  8/2006  Clark ...................... F21S 8/086
                                                362/183

(Continued)

FOREIGN PATENT DOCUMENTS

CN   201100557 Y   8/2008
CN   201496879 U   6/2010
(Continued)

*Primary Examiner* — Robert May (57) ABSTRACT

There is provided a lighting apparatus and a method for reducing discomfort glare. The method comprises a step of providing a first portion of light radiation in a first incident angle range; and another step of providing a second portion of light radiation in a second incident angle range consecutive to the first incident angle range. The first incident angle range is greater than the second incident angle range viewed from a vertically downward direction of a light source emitting the light radiation, and the correlated color temperature of the first portion of light radiation is lower than that of the second portion of light radiation.

18 Claims, 5 Drawing Sheets

(51) Int. Cl.
*F21S 8/08* (2006.01)
*F21V 5/04* (2006.01)
*F21V 9/16* (2006.01)
*F21V 9/08* (2006.01)
*F21W 131/103* (2006.01)
*G02B 19/00* (2006.01)
*F21Y 101/00* (2016.01)
*F21Y 105/10* (2016.01)
*F21Y 115/10* (2016.01)
*F21Y 107/20* (2016.01)

(52) U.S. Cl.
CPC ............... *F21V 9/08* (2013.01); *F21V 9/16* (2013.01); *F21W 2131/103* (2013.01); *F21Y 2101/00* (2013.01); *F21Y 2105/10* (2016.08); *F21Y 2107/20* (2016.08); *F21Y 2115/10* (2016.08); *G02B 19/0061* (2013.01)

(58) Field of Classification Search
CPC ........ F21V 13/02; F21V 9/08; F21Y 2101/02; F21Y 2115/10
See application file for complete search history.

(56) References Cited

U.S. PATENT DOCUMENTS

| | | | |
|---|---|---|---|
| 7,758,221 B2 | 7/2010 | Weijers | |
| 8,215,798 B2* | 7/2012 | Rains, Jr. | F21K 9/00 362/293 |
| 8,308,318 B2* | 11/2012 | Maxik | F21S 2/00 362/153.1 |
| 2004/0183081 A1 | 9/2004 | Shishov et al. | |
| 2008/0055896 A1 | 3/2008 | Feldmeier | |
| 2009/0237925 A1 | 9/2009 | Chao et al. | |
| 2009/0302343 A1 | 12/2009 | Sato et al. | |
| 2010/0091518 A1 | 4/2010 | Su | |
| 2010/0216364 A1 | 8/2010 | Yang et al. | |
| 2011/0305001 A1 | 12/2011 | Medendorp | |
| 2012/0038291 A1 | 2/2012 | Hasnain | |
| 2013/0154519 A1* | 6/2013 | Riesebosch | H01L 25/0753 315/312 |
| 2014/0247579 A1* | 9/2014 | Hikmet | F21V 3/0463 362/84 |

FOREIGN PATENT DOCUMENTS

| | | | |
|---|---|---|---|
| CN | 201811027 U | 4/2011 | |
| CN | 201902967 U | 7/2011 | |
| CN | 202032397 U | 11/2011 | |
| CN | 202118809 U | 1/2012 | |
| JP | 2011199219 A | 10/2011 | |
| WO | WO 2013118037 A1 * | 8/2013 | F21K 9/56 |

* cited by examiner

LIGHTING APPARATUS AND METHOD FOR EMITTING LIGHT HAVING DIFFERENT COLOR TEMPERATURES

CROSS-REFERENCE TO PRIOR APPLICATIONS

This application is the U.S. National Phase application under 35 U.S.C. §371 of International Application No. PCT/IB2013/054176, filed on May 21, 2013, which claims the benefit of European Patent Application No. PCT/CN2012/076511, filed on Jun. 6, 2012. These applications are hereby incorporated by reference herein.

FIELD OF THE INVENTION

The invention generally relates to lighting technology, and more particularly relates to a lighting apparatus and a method for reducing discomfort glare from a luminaire.

BACKGROUND OF THE INVENTION

Solid-state light sources, such as light emitting diodes (LED), are frequently used in luminaires because such light sources have a high luminous efficacy and a long lifetime. For many white LEDs used in general lighting applications such as road lighting and office lighting, the correlated color temperature (CCT) of the light radiation emitted therefrom is greater than or equal to 5000K. This light radiation may cause discomfort glare to users, especially under conditions where a high luminous intensity of the light radiation is required, such as road lighting. Therefore, many luminaires are designed to cut off their light radiation at the high incident angle, i.e. the direction of luminous intensity γ in the coordinate system in accordance with CIE140-2010, so as to reduce such discomfort glare. However, the cut-off light radiation may adversely influence the performance of such luminaires.

SUMMARY OF THE INVENTION

It would, therefore, be advantageous to provide a lighting apparatus and a method for reducing discomfort glare from a luminaire.

The inventors have studied several factors which may affect the visual perception of discomfort glare, and found that the correlated color temperature of light radiation has substantial influence on the discomfort glare perceived by human eyes. Specifically, light radiation with a low correlated color temperature can be perceived as less glary than light radiation with a high correlated color temperature. Besides, the inventors also found that some amount of light radiation at a high incident angle can increase the adaptation luminance level of human eyes, and thus helps to reduce such discomfort glare.

According to an embodiment of the invention, there is provided a method for reducing discomfort glare, which comprises: providing a first portion of light radiation in a first incident angle range; and providing a second portion of light radiation in a second incident angle range consecutive to the first incident angle range; wherein the first incident angle range is greater than the second incident angle range viewed from a vertically downward direction of a light source emitting the light radiation, and the correlated color temperature of the first portion of light radiation is lower than that of the second portion of light radiation.

In some examples of the invention, the second portion of the light radiation with the higher correlated color temperature can be used to provide sufficient luminous intensity for a desired illumination field, while the first portion of the light radiation with the lower correlated color temperature can be used to increase the adaptation luminance level of human eyes so as to reduce the discomfort glare. Such luminous intensity distribution can be realized by adjusting the luminous intensity at different incident angles for different portions of the light radiation. For example, the second portion of the light radiation can illuminate a lower field in terms of the eyes of an observer, such as ground or roads, which contributes to the luminance level of the visual tasks and it will not cause direct discomfort glare to the observer. Besides, the consecutive two portions of the light radiation also help to reduce visual discomfort.

In an embodiment, the first incident angle range is from 70 degrees to 90 degrees, and the second incident angle range is below 70 degrees. Such light radiation distribution can meet the requirement for road illumination.

In an embodiment, the correlated color temperature of the first portion of the light radiation is equal to or below 3000K, and the correlated color temperature of the second portion of the light radiation ranges from 4000K to 6500K. The light radiation with the correlated color temperature equal to or below 3000K is especially beneficial to reduce the discomfort glare perception of human eyes.

In an embodiment, the step of providing the first portion of the light radiation comprises: emitting the light radiation from a light source; converting the first portion of the light radiation from the light radiation emitted from the light source; and directing the first portion of the light radiation at the first incident angle range.

In an embodiment, the step of converting the first portion of the light radiation comprises: converting the first portion of the light radiation by light filtering or a luminescent process. Such ways of converting light are compatible with the existing luminaires.

In an embodiment, the first portion and the second portion of the light radiation are emitted from a light source having at least two regions for emitting light radiation with a different correlated color temperature.

In another aspect of the invention, there is provided a lighting apparatus, which comprises: a light source for emitting light radiation; a conversion element for converting a portion of the light radiation, wherein the correlated color temperature of the converted portion of the light radiation is lower than that of an unconverted portion of the light radiation; and a directing element for directing the converted portion of the light radiation in a first incident angle range, and directing the unconverted portion of the light radiation in a second incident angle range consecutive to the first incident angle range, wherein the first incident angle range is greater than the second incident angle range viewed from a vertically downward direction of the light source.

In a further aspect of the invention, there is also provided a lighting apparatus, which comprises: a light source for emitting light radiation, wherein the light source has a first region for emitting a first portion of the light radiation and a second region for emitting a second portion of the light radiation, and the correlated color temperature of the first portion of the light radiation is lower than that of the second portion of the light radiation; wherein the first region and the second region are arranged in such a manner that the first portion of the light radiation is directed in a first incident angle range, and the second portion of the light radiation is directed at a second incident angle consecutive to the first incident angle range, wherein the first incident angle range is greater than the second incident angle range viewed from a vertically downward direction of the light source.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

The inventor or inventors have studied several factors which may affect visual perception of discomfort glare in light radiation emitted from a luminaire. Through research, the inventor or inventors have found that the correlated color temperature of light radiation has substantial influence on the discomfort glare. It has also been found that the incident angle of the light radiation affects the perception of such discomfort glare.

Figure 1:
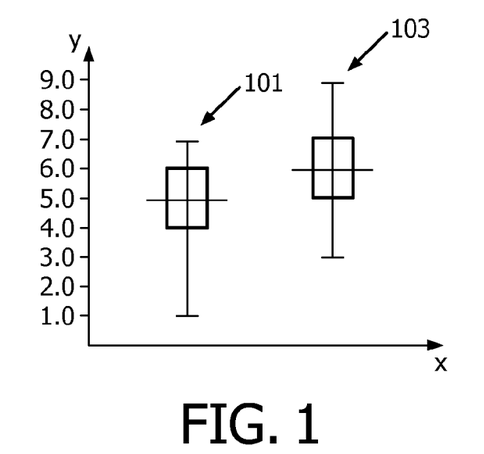
FIG. 1 depicts the influence of a multi-direction light source on glare perception of human eyes.

FIG. 1 depicts the influence of a multi-direction light source on glare perception of human eyes, wherein the y axis denotes the deBoer rating (dimensionless). As depicted in FIG. 1, Graph 101 denotes the deBoer rating for a single-direction light source, i.e. a light source whose light radiation in a high incident angle range is cut-off, and Graph 103 denotes the deBoer rating for a multi-direction light source, i.e. a light source emitting light radiation in both the high incident angle range and the low incident angle range. The high incident angle range and the low incident angle range are both viewed from the vertically downward direction from the light sources. The deBoer rating for the single-direction light source is around 5.00, and the deBoer rating for the multi-direction light source is around 6.00. A higher deBoer rating indicates less discomfort glare. Therefore, this comparison for the different light sources shows that the discomfort glare can be significantly reduced by the multi-direction light source, i.e. the light source emitting the light radiation in the high incident angle range, for example, above 80 degrees. The main reason for such reduction of the discomfort glare is that some amount of the light radiation in the high incident angle range influences the glare perception and helps to improve the adaptation luminance level of human eyes.

Figure 2:
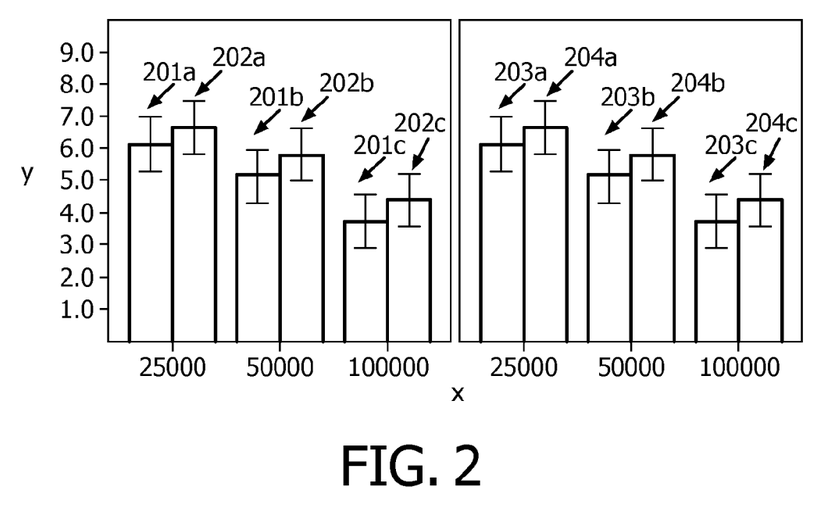
FIG. 2 depicts the influence of the correlated color temperature of light radiation on glare perception of human eyes.

FIG. 2 depicts the influence of the correlated color temperature of light radiation on glare perception of human eyes at different viewing angles, wherein the left diagram denotes the glare perception viewed at an angle of 0 degrees (direct view), and the right diagram denotes the glare perception viewed at an angle of 10 degrees, i.e. the glare source is at an angle of 10 degrees relative to the line of sight. In FIG. 2, the x axis denotes the average luminance of the light source ($cd/m^2$), and the y axis denotes the deBoer rating (dimensionless). As shown in FIG. 2, Graphs 201a and 203a, Graphs 201b and 203b, and Graphs 201c and 203c show the respective deBoer ratings for a light source with a correlated color temperature of 6000K under illumination intensities of 25000 $cd/m^2$, 50000 $cd/m^2$ and 100000 $cd/m^2$; and Graphs 202a and 204a, Graphs 202b and 204b, and Graphs 202c and 204c show the respective deBoer ratings for another light source with a correlated color temperature of 3000K under the same luminance level. As can be seen from FIG. 2, the light radiation emitted from the light source with the correlated color temperature of 3000K is perceived as less glary than that emitted from the light source with the correlated color temperature of 6000K. Moreover, other light sources with correlated color temperatures below 3000K have similar results. It can be seen from the foregoing that these test results clearly show that the light radiation with the correlated color temperature below 3000K is significantly better than the light radiation with the higher correlated color temperature, such as in a range of 4000K to 6500K, or higher.

Figure 3:
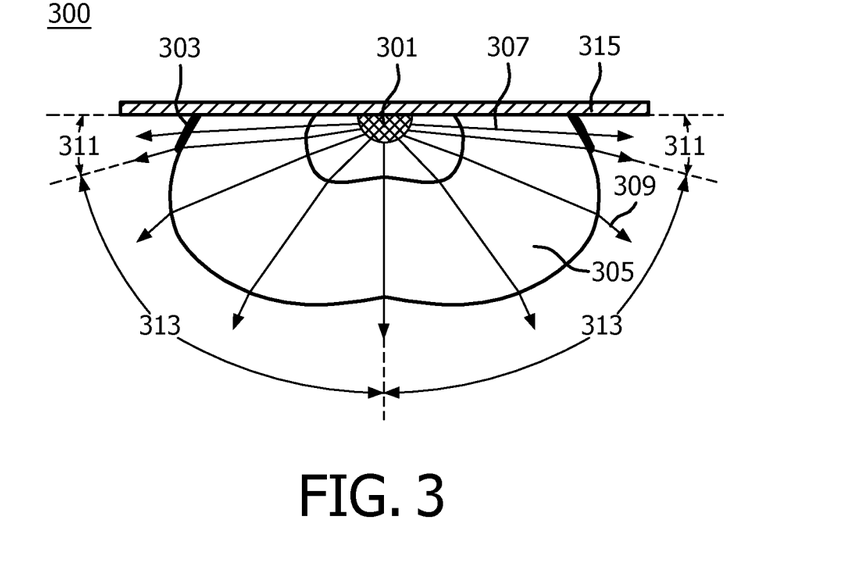
FIG. 3 depicts a lighting apparatus 300 according to an embodiment of the invention.

FIG. 3 depicts a lighting apparatus 300 according to an embodiment of the invention. The apparatus 300 may be used for indoor lighting, overhead lighting, road lighting, or any other suitable lighting applications.

As depicted in FIG. 3, the lighting apparatus 300 comprises:

a light source 301 for emitting light radiation;

a conversion element 303 for converting a portion 307 of the light radiation, wherein the correlated color temperature of the converted portion 307 of the light radiation is lower than that of an unconverted portion 309 of the light radiation; and a directing element 305 for directing the converted portion 307 of the light radiation within a first incident angle range 311, and for directing the unconverted portion 309 of the light radiation within a second incident angle range 313 consecutive to the first incident angle range 311, wherein the first incident angle range 311 is greater than the second incident angle range 313 viewed from a vertically downward direction of the light source 301.

In the embodiment illustrated in FIG. 3, the light source 301 may be a fluorescent lamp, a solid-state light source, such as a light emitting diode device, or any other suitable light source capable of emitting light radiation which covers, at least in part, the visible wavelength range from 380 nm to 780 nm. In an example, the correlated color temperature of the light radiation emitted from the light source 301 ranges from 4000K to 6500K. Therefore, the correlated color temperature of the unconverted portion 309 of the light radiation is from 4000K to 6500K. In some examples, the light source 301 may further comprise one or more optical elements (not shown) for adjusting the luminous flux, luminous intensity, incident direction, and/or distribution of the light radiation emitted therefrom. For example, the optical element may be a reflector, a lens or a refracting plate. The optical element may be integrally incorporated within the light source 301.

As depicted in FIG. 3, the light source 301 is mounted on a back plate 315, which is used to support the light source 301. The back plate 315 is generally opaque. As a result, the back plate 315 may prevent passage of a part of the light radiation; instead, it will reflect said part of the light radiation.

The conversion element 303 can be used to convert the portion 307 of the light radiation by changing its energy spectrum. For example, the correlated color temperature of the portion 307 can be lowered by adding light with long wavelengths, such as yellow light or red light, or by converting light with short wavelengths, such as blue light or violet light, into light with longer wavelengths. Generally, the larger the proportion of light with long wavelengths in the converted portion 307, the lower the correlated color temperature of the converted portion 307 is. In this way, the correlated color temperature of the converted portion 307 of the light radiation can be lowered. In an example, the correlated color temperature of the portion 307 of the light radiation emitted from the light source 301 is converted to below 3000K, which is lower than the correlated color temperature of the unconverted portion 309, which ranges from 4000K to 6500K. In some embodiments, deviations of the correlated color temperature of the converted portion 307 or the unconverted portion 309 are allowed. For example, the converted portion 307 of the light radiation with a correlated color temperature below 3500K still works and is also helpful to reduce discomfort glare. Further, the unconverted portion 309 of the light radiation with a correlated color temperature from 4500K to 7000K also works. It will be appreciated that these deviations are also within the scope of the invention. Besides, as the correlated color temperature of the light beams emitted at different incident angles within the first or the second incident angle range may be slightly different, the correlated color temperature of the converted portion 307 or the unconverted portion 309 should be determined as a statistical value, such as an average value or a mean value, derived from the correlated color temperature of the light beams.

In an example, the conversion element 303 may be a light filter such as a color film, which only permits passage of a specific wavelength range in the portion 307 of the light radiation. The color film can be covered on one side or both sides of the directing element 305. In another example, the conversion element 303 may be a color material suitable to be doped into the directing element 305. In this way, the directing element 305 can direct the direction of incidence of the light radiation as well as convert the light radiation via the conversion element 303. In some other examples, the conversion element 303 may be a phosphor coating, which is used to convert a specific wavelength range in the portion 307 of the light radiation to another wavelength range so as to change the energy spectrum of the portion 307 of the light radiation. The phosphor coating can be coated on a predetermined region of the directing element 305.

The directing element 305 is also mounted on the back plate 315, and disposed outside the light source 301 so as to direct the direction of incidence of the light radiation. In some examples, the directing element 305 may be a lens. In some other examples, the directing element 305 may be a transparent cover plate. The conversion element 303 can be disposed in a predetermined region of the directing element 305 in a manner such that the converted portion 307 of the light radiation can only be directed within the first incident angle range 311 by the directing element 305. Further, the unconverted portion 309 of the light radiation can be directed within the second incident angle range 313 different from the first incident angle range 311. As the light radiation is diffusively emitted from the light source 301, the converted portion 307 and the unconverted portion 309 should be consecutive to each other. When the lighting apparatus 300 is used for illumination, the two consecutive portions of the light radiation help to avoid visual discontinuity so as to reduce visual discomfort.

It will be appreciated that the incident angle ranges for the two portions of the light radiation can be adjusted by changing the optical path of the directing element 305 so as to meet the lighting requirements in different applications. In some examples, the lighting apparatus 300 is installed over the head of an observer so as to provide road lighting or overhead lighting.

Therefore, the first incident angle range 311, within which the converted portion 307 is directed, is greater than the second incident angle range 313, within which the unconverted portion 309 is directed, viewed from a vertically downward direction of the light source 301. In this way, the unconverted portion 309 of the light radiation with the higher correlated color temperature can be used to provide sufficient luminous intensity for a desired visual field positioned lower than the observer's eyes, for example, a road or a desk. And the unconverted portion 309 of the light radiation will not be directly emitted into the observer's eyes. Instead, it will only generate indirect light with much lower intensity after reflection from the road or the desk. The converted portion 307 of the light radiation may cause direct glare into the observer's eyes. However, as the correlated color temperature of the converted portion 307 of the light radiation is much lower, it will be perceived as less glary. Moreover, the converted portion 307 is also helpful to increase the adaptation luminance of the observer's eyes so as to reduce discomfort glare. As a result, the lighting apparatus 300 can significantly reduce discomfort glare.

In an example, the first incident angle range 311 is from 70 to 90 degrees, and the second incident angle range 313 is below 70 degrees, both of which are viewed from the vertically downward direction of the light source 301. Such light intensity distribution meets the requirement for road lighting.

Figure 4:
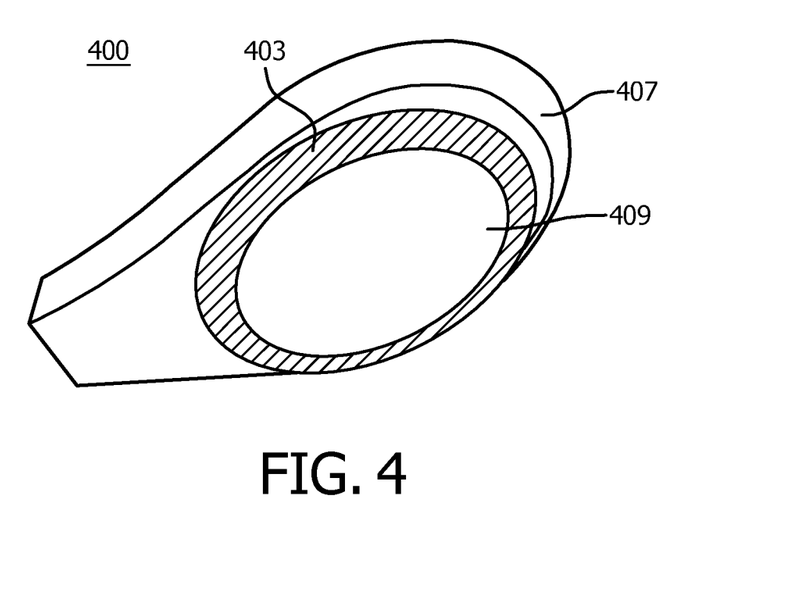
FIGS. 4 and 5 depict a lighting apparatus 400 according to an embodiment of the invention.
Figure 5:
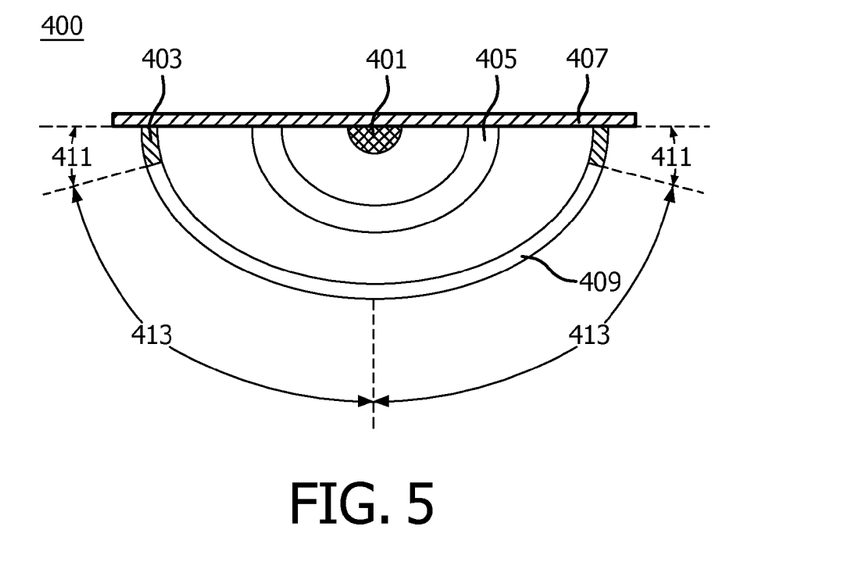

FIGS. 4 and 5 depict a lighting apparatus 400 according to an embodiment of the invention, wherein FIG. 4 is a perspective view of the lighting apparatus 400, and FIG. 5 is a cross sectional view of the lighting apparatus 400.

As depicted in FIGS. 4 and 5, the lighting apparatus 400 comprises a light source 401, a conversion element 403 and a directing element 405, which are installed on a back plate 407. Moreover, the lighting apparatus 400 also comprises a cover plate 409 for protecting the inner elements. The cover plate 409 is placed outside the directing element 405 so as to enclose the light source 401 and the directing element 405 with the back plate 407. In the embodiment, the conversion element 403 is disposed in a predetermined region of the cover plate 409. When a portion of the light radiation passes through the predetermined region of the cover plate 409 with the conversion element 403, it can be converted to light radiation with a lower correlated color temperature. Meanwhile, the other portion of the light radiation passes through the other region of the cover plate 409 without the conversion element 403, and thus will not be converted. The cover plate 409 is light-pervious. In some examples, the cover plate 409 may be comprised of plastics, glass, or any other transparent or semi-transparent materials. The conversion element 403 may comprise a light filter or a phosphor coating. It can be seen from the foregoing that the lighting apparatus 400 can be designed in a manner fully compatible with conventional lighting apparatuses, which significantly reduces its manufacturing cost.

In the embodiment depicted in FIGS. 4 and 5, the lighting apparatus 400 can be used as a road luminaire. The conversion element 403 within the lighting apparatus 400 may be covered in the peripheral region of the cover plate 409. In some other examples, as the road luminaire may be used to provide illumination on a road, the conversion element 403 within the lighting apparatus 400 may be covered in a part of the peripheral region of the cover plate 409 through which the light radiation is possibly directed to drivers moving on the road, leaving the other part of the peripheral region of the cover plate 409 through which the light radiation is not directed to drivers (i.e. directed outside the road) uncovered. Moreover, the converted portion of the light radiation with a lower correlated color temperature can be directed in a first incident angle range 411 ranging from 70 degrees to 90 degrees, and the unconverted portion of the light radiation can be directed in a second incident angle range 413 below 70 degrees. In this way, the light radiation emitted from the lighting apparatus 400 can be perceived as much less glary by drivers, which is helpful to reduce the risk of traffic accidents.

Figure 6:
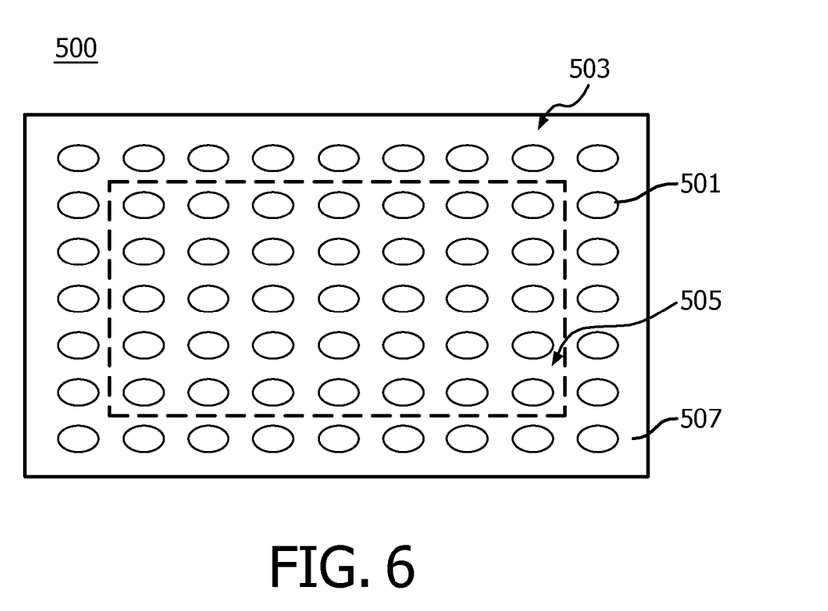
FIGS. 6, 7 and 8 depict a lighting apparatus 500 according to an embodiment of the invention.
Figure 7:
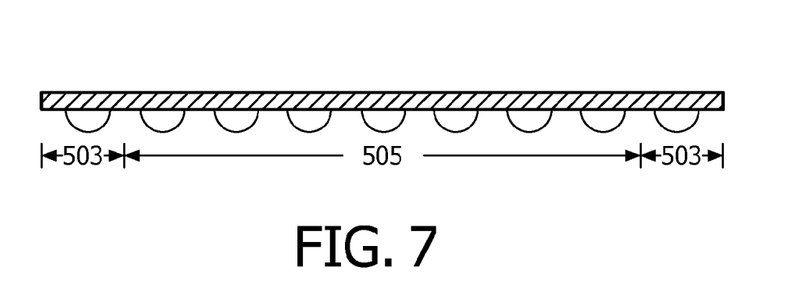
Figure 8:
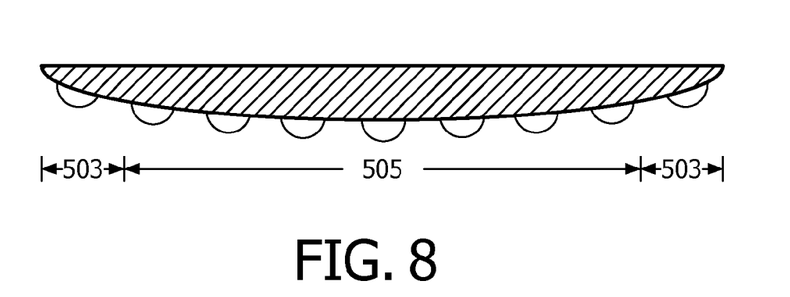

FIGS. 6 to 8 depict a lighting apparatus 500 according to an embodiment of the invention. As depicted in FIG. 6, the light apparatus 500 comprises: a light source 501 for emitting light radiation, wherein the light source 501 has a first region 503 for emitting a first portion of the light radiation and a second region 505 for emitting a second portion of the light radiation, and the correlated color temperature of the first portion of the light radiation is lower than that of the second portion of the light radiation. The first region 503 and the second region 505 is arranged in such a manner that the first portion of the light radiation is directed in a first incident angle range, and the second portion of the light radiation is directed in a second incident angle range consecutive to the first incident angle range, wherein the first incident angle range is greater than the second incident angle range from a vertically downward direction of the light source 501.

In the embodiment illustrated in FIG. 6, the light source 501 may comprise a plurality of light source cells for emitting the light radiation respectively. For example, the light source 501 may be an LED array including a plurality of LEDs. Among the plurality of light source cells, the cells within the first region 503 emit the light beams forming the first portion of the light radiation, and the other cells within the second region 505 emit the light beams forming the second portion of the light radiation. In an example, the correlated color temperature of the first portion of the light radiation is equal to or below 3000K, and the correlated color temperature of the second portion of the light radiation ranges from 4000K to 6500K. The second portion of the light radiation with the higher correlated color temperature can be used to provide sufficient luminous intensity for a desired illumination field, while the first portion of the light radiation with the lower correlated color temperature can be used to increase the adaptation luminance of human eyes so as to reduce discomfort glare. Moreover, as the light source cells within lighting apparatus 500 are generally closely spaced, the light radiation emitted from different cells within the two regions can hardly be distinguished. Thus, the two portions of the light radiation are consecutive to each other when perceived by an observer, which helps to reduce visual discomfort.

As depicted in FIG. 6, the light source 501 is placed on a back plate 507, which is used to support the light source 501. The shape of the back plate 507 and the positions of the two regions of the light source 501 can be adjusted so as to direct the two portions of the light radiation in respective incident angle ranges. In an example, the first incident angle range is from 70 degrees to 90 degrees, and the second incident angle range is below 70 degrees, both of which are viewed from the vertically downward direction of the light source 501.

FIGS. 7 and 8 depict two examples of the lighting apparatus 500. As depicted in FIG. 7, the first region 503 is arranged at the periphery of the second region 505. As a result, the first incident angle range in which the first portion of the light radiation is emitted from the first region 503 may be greater than the second incident angle range in which the second portion of the light radiation is emitted from the second region 505. As depicted in FIG. 8, the back plate 507 can be curved such that the first portion of the light radiation emitted from the first region 503 can be more easily directed in greater incident angle ranges. It will be appreciated that the lighting apparatus 500 may further comprise some other optical elements for converting or directing the light radiation.

Figure 9:
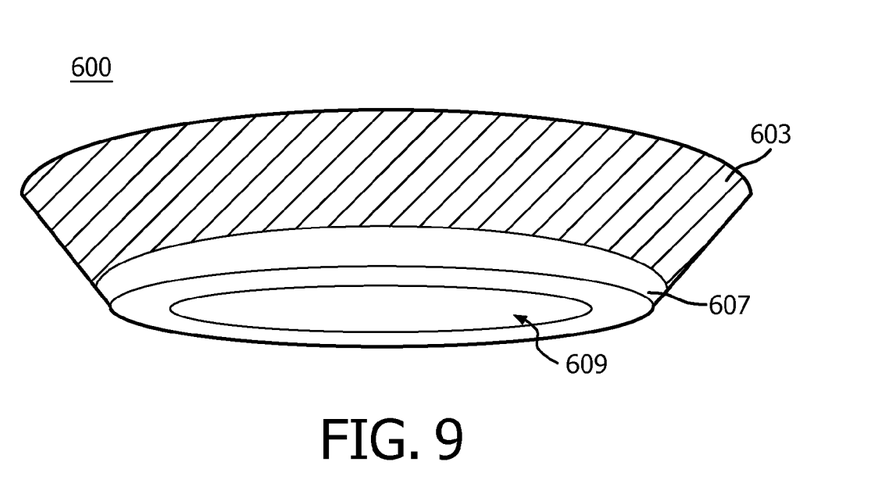
FIG. 9 depicts a lighting apparatus 600 according to an embodiment of the invention.

FIG. 9 depicts a lighting apparatus 600 according to an embodiment of the invention.

As depicted in FIG. 9, the lighting apparatus 600 comprises a light source (not shown) for emitting light radiation. The light source has a first region 603 for emitting a first portion of the light radiation and a second region (not shown) for emitting the second portion of the light radiation. In the embodiment, the light source 601 is disposed inside a support frame 607. The support frame 607 can be designed to direct the two portions of the light radiation in two different and consecutive incident angle ranges. Specifically, the first region 603 of the light source 601 may be a light band, which can be used to emit the first portion of the light radiation. Moreover, an opening 609 on the bottom side of the support frame 607 can be used to emit the second portion of the light radiation out of the lighting apparatus 600.

The first region 603 and the second region 605 of the light source 601 can emit the light radiation with different correlated color temperatures. Specifically, the correlated color temperature of the first portion of the light radiation is lower than that of the second portion of the light radiation. For example, the first region 603 can be a light band with the lower correlated color temperature, such as a yellow or red light band. And the second region can be a white light source with the higher correlated color temperature.

Figure 10:
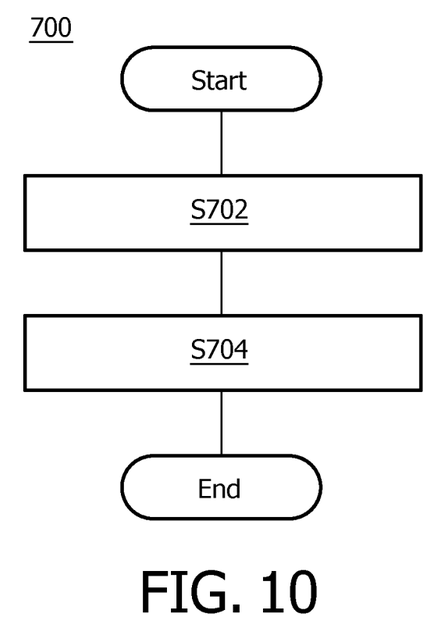
FIG. 10 depicts a method 700 for reducing discomfort glare according to an embodiment of the invention.

FIG. 10 depicts a method 700 of reducing discomfort glare according to an embodiment of the invention. The method 700 may be used for indoor lighting, overhead lighting, road lighting, or any other suitable lighting applications.

As depicted in FIG. 10, the method 700 comprises Step S702 of providing a first portion of light radiation in a first incident angle range, and Step S704 of providing a second portion of the light radiation in a second incident angle range consecutive to the first incident angle range, wherein the first incident angle range is greater than the second incident angle range viewed from a vertically downward direction of a light source emitting the light radiation, and the correlated color temperature of the first portion of the light radiation is lower than that of the second portion of the light radiation. In some embodiments, the first incident angle range is from 70 degrees to 90 degrees, and the second incident angle range is below 70 degrees, both of which are viewed from the vertically downward direction of the light source. In some embodiments, the correlated color temperature of the first portion of the light radiation is equal to or below 3000K, and the correlated color temperature of the second portion of the light radiation ranges from 4000K to 6500K.

It will be appreciated that the incident angle ranges for the two portions of the light radiation can be adjusted by changing the optical path or structure of an optical system for implementing the method 700. The optical system may comprise the lighting apparatus 300, 400, 500 or 600 depicted in FIGS. 3 to 10. In an embodiment, the step of providing the first portion of the light radiation comprises emitting the light radiation from a light source; converting the first portion of the light radiation forming part of the light radiation emitted from the light source; and directing the first portion of the light radiation in the first incident angle range. In some examples, the first portion of the light radiation can be converted by light filtering or a luminescent process. For example, a light filter, such as a color film, which only permits passage of a specific wavelength range, can be used to convert the first portion of the light radiation. In some other examples, a phosphor coating can be used to convert a specific wavelength range in the portion of the light radiation to another wavelength range so as to convert the first portion of the light radiation. In another embodiment, the first portion and the second portion of the light radiation can be emitted from a light source having at least two regions for emitting light radiation with different correlated color temperature. The relative positions of the at least two regions of the light source can be adjusted so as to change the incident angle ranges for the two portions. Alternatively, one or more directing elements such as reflectors, lenses or refracting plates can be arranged in combination with the at least two regions of the light source so as to direct the incident angle ranges for the two portions of the light radiation.

With such an invention, the second portion of the light radiation with the higher correlated color temperature can be used to provide sufficient luminous intensity for a desired illumination field, while the first portion of the light radiation with the low correlated color temperature can be used to increase the adaptation luminance level of human eyes so as to reduce discomfort glare. Such light radiation distribution can be realized by adjusting the incident angles for different portions of the light radiation. Besides, the consecutive two portions of the light radiation also help to reduce visual discomfort.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A method for reducing discomfort glare, comprising:
   providing a first portion of light radiation in a first incident angle range; and
   providing a second portion of light radiation in a second incident angle range, consecutive to the first incident angle range,
   wherein the first incident angle range is greater than the second incident angle range, measured from a central axis of a light source, of a lighting device, emitting at least the second portion of light radiation, and, at a given moment, the average correlated color temperature of the first incident angle range is equal to or below 3500K outside of the lighting device and is visible to a first person viewing the device, and, at the given moment, the average correlated color temperature of the second incident angle range is within a range from 4000K to 6500K or from 4500K to 7000K outside of the lighting device and is visible to a second person viewing the device.

2. The method as claimed in claim 1, wherein the first incident angle range is from 70 degrees to 90 degrees, and the second incident angle range is below 70 degrees.

3. The method as claimed in claim 1, wherein the average correlated color temperature of the first incident angle range is equal to or below 3000K, and the average correlated color temperature of the second incident angle range is within a range from 4000K to 6500K.

4. The method as claimed in claim 1, wherein the step of providing the first portion of light radiation, comprises:
   emitting light source radiation from the light source;
   converting a portion of the light source radiation into the first portion of light radiation, and
   directing the first portion of the light radiation within the first incident angle range.

5. The method as claimed in claim 4, wherein the converting comprises:
   converting the portion of the light source radiation by light filtering or a luminescent process.

6. The method as claimed in claim 1, wherein the first portion of light radiation is emitted from a first region of the light source, and wherein the second portion of light radiation is emitted from a second region of the light source that is different from the first region.

7. The method as claimed in claim 1, wherein the first incident angle range is from 70 degrees to 90 degrees, and the second incident angle range is above 45 degrees and below 70 degrees.

8. A lighting apparatus, comprising:
   a light source for emitting light radiation;
   a conversion element for converting a portion of the light radiation, wherein the correlated color temperature of the converted portion of the light radiation is lower than that of an unconverted portion of the light radiation; and
   a directing element, which is distinct from the conversion element, for directing the converted portion of the light radiation such that a majority of the converted portion of the light is within a first incident angle range, and directing the unconverted portion of the light radiation such that the unconverted portion constitutes a majority of the light radiation within a second incident angle range consecutive to the first incident angle range, wherein the first incident angle range is greater than the second incident angle range, viewed from a vertically downward direction of the light source.

9. The apparatus as claimed in claim 8, wherein the first incident angle range is from 70 degrees to 90 degrees, and the second incident angle range is below 70 degrees.

10. The apparatus as claimed in claim 8, wherein the correlated color temperature of the converted portion of the light radiation is equal to or below 3000K, and the correlated color temperature of the unconverted portion of the light radiation is within a range from 4000K to 6500K.

11. The apparatus as claimed in claim 8, wherein the conversion element comprises a light filter or a phosphor coating.

12. The lighting apparatus of claim 8, wherein the correlated color temperature of the first portion of light radiation is equal to or below 3500K, and the correlated color temperature of the second portion of light radiation is within a range from 4000K to 6500K or from 4500K to 7000K, and wherein the correlated color temperature of the first portion of light radiation and the correlated color temperature of the second portion of light radiation are average correlated color temperatures.

13. The lighting apparatus of claim 8, wherein the first incident angle range is from 70 degrees to 90 degrees, and the second incident angle range is above 45 degrees and below 70 degrees, and wherein the first incident angle range and the second incident angle range are measured from a central axis of the light source.

14. A lighting apparatus, comprising:
- a light source for emitting light radiation, wherein the light source has a first region for emitting a first portion of the light radiation and a second region for emitting a second portion of the light radiation; and
- wherein the first region and the second region are arranged in such a manner that the first portion of the light radiation is directed in a first incident angle range, and the second portion of the light radiation is directed in a second incident angle range that is above 45 degrees and below 70 degrees and is consecutive to the first incident angle range, wherein the first incident angle range is greater than the second incident angle range, wherein the first and second incident angle ranges are measured from a central axis of the light source, and wherein the average correlated color temperature of the first incident angle range at a given moment outside of the lighting apparatus is lower than the average correlated color temperature of the second incident angle range at the given moment outside of the lighting apparatus, and wherein the average correlated color temperature of the first incident angle range is visible to a first person viewing the lighting apparatus and the average correlated color temperature of the second incident angle range is visible to a second person viewing the lighting apparatus.

15. The apparatus as claimed in claim 14, wherein the first incident angle range is from 70 degrees to 90 degrees.

16. The apparatus as claimed in claim 14, wherein the first region is arranged at the periphery of the second region.

17. The apparatus as claimed in claim 14, wherein the correlated color temperature of the first portion of the light radiation is equal to or below 3000K, and the correlated color temperature of the second portion of the light radiation is within a range from 4000K to 6500K.

18. The apparatus as claimed in claim 14, wherein the correlated color temperature of the first portion of light radiation is equal to or below 3500K, and the correlated color temperature of the second portion of light radiation is within a range from 4000K to 6500K or from 4500K to 7000K.

* * * * *